(12) United States Patent
Xu et al.

(10) Patent No.: US 9,754,554 B1
(45) Date of Patent: Sep. 5, 2017

(54) PIXEL STRUCTURE

(71) Applicant: Wuhan China Star Optoelectronics Technology Co., Ltd., Wuhan (CN)

(72) Inventors: Liang Xu, Wuhan (CN); Chiying Lin, Wuhan (CN)

(73) Assignee: WUHAN CHINA STAR OPTOELECTRONICS TECHNOLOGY CO., LTD., Whuan, Hubei (CN)

( * ) Notice: Subject to any disclaimer, the term of this patent is extended or adjusted under 35 U.S.C. 154(b) by 103 days.

(21) Appl. No.: 14/908,543

(22) PCT Filed: Dec. 23, 2015

(86) PCT No.: PCT/CN2015/098462
§ 371 (c)(1),
(2) Date: Jan. 29, 2016

(87) PCT Pub. No.: WO2017/063273
PCT Pub. Date: Apr. 20, 2017

(30) Foreign Application Priority Data

Oct. 13, 2015 (CN) .......................... 2015 1 0670039

(51) Int. Cl.
*G09G 5/02* (2006.01)
*G09G 5/10* (2006.01)

(52) U.S. Cl.
CPC ................. *G09G 5/02* (2013.01); *G09G 5/10* (2013.01); *G09G 2300/0452* (2013.01)

(58) Field of Classification Search
CPC ..... G09G 5/02; G09G 5/10; G09G 2300/0452
See application file for complete search history.

(56) References Cited

U.S. PATENT DOCUMENTS

| 6,373,195 B1* | 4/2002 | Whang | H01J 11/12 313/584 |
| 2005/0134175 A1* | 6/2005 | Chen | H01J 11/12 313/582 |

(Continued)

*Primary Examiner* — Ariel Balaoing
(74) *Attorney, Agent, or Firm* — Leong C. Lei

(57) ABSTRACT

The present invention provides a pixel structure, which includes a plurality of sub-pixels arranged in the form of a point lattice exhibiting a honeycomb configuration comprising honeycomb cells each showing a regular hexagon having edges that have a length a; for two rows of the sub-pixels that are adjacent to each other in an up-down direction, the sub-pixels of one of the rows are arranged in a horizontal direction such that spacing distances therebetween are of an alternate arrangement of a and 2a, wherein for every two sub-pixels of which the spacing distance therebetween is a, the one of the sub-pixels that is located at the right-hand side is a first color sub-pixel (1), while the one of the sub-pixels that is located at the left-hand side is a second color sub-pixel (2); and, the sub-pixels of the other one of the rows are arranged in a horizontal direction such that spacing distances therebetween are of an alternate arrangement of 2a and a, wherein for every two sub-pixels of which the spacing distance therebetween is a, the one of the sub-pixels that is located at the right-hand side is a first color sub-pixel (1), while the one of the sub-pixels that is located at the left-hand side is a third color sub-pixel (3); for each column of the sub-pixels, multiple ones of the sub-pixels having the same color are arranged in a straight line in a vertical direction. Such a pixel structure achieves an effect of mimicking a high resolution with a low resolution and also reduces the design difficulty of a drive circuit thereby helping simplify the manufacturing process and lower down costs.

15 Claims, 3 Drawing Sheets

(56) References Cited

U.S. PATENT DOCUMENTS

| | | | | |
|---|---|---|---|---|
| 2006/0290870 | A1* | 12/2006 | Kwak | G02F 1/133514 349/144 |
| 2009/0109172 | A1* | 4/2009 | Lee | G09G 3/344 345/107 |
| 2016/0284766 | A1* | 9/2016 | Wang | H01L 27/3218 |
| 2017/0047382 | A1* | 2/2017 | Huangfu | H01L 27/32 |

\* cited by examiner

PIXEL STRUCTURE

BACKGROUND OF THE INVENTION

1. Field of the Invention

The present invention relates to the field of display technology, and in particular to a pixel structure.

2. The Related Arts

Tablet display devices, such as liquid crystal displays (LCDs) and organic light emitting diode (OLED) displays, are the main streams of today's market.

A display panel is an important constituent part of the tablet display devices, such as LCDs and OLEDs. In a conventional display device of LCD and OLED, the display panel comprises a plurality of pixels arranged in an array. Each of the pixels comprises a plurality of sub-pixels. For example, each pixel comprises red (R), green (G), and blue (B) sub-pixels. Each pixel display colors through color mixture. To improve visual effect, people have placed increasingly high demand for resolution of the display panel. This makes the size of the sub-pixels increasingly reduced. However, the constraints of the manufacturing techniques make it not possible to unlimitedly reduce the size of the sub-pixels. To improve the effect of displaying under the same size of sub-pixels, heretofore a so-call Pen Tile structure has been proposed for the display panels.

The pen tile structure reduces the number of sub-pixels by having sub-pixels commonly shared by adjacent pixels so that an effect of mimicking a high resolution with a low resolution may be achieved. In a display panel of the pen tile structure, an image to be displayed is divided into multiple theoretic pixel units according to the resolution of a screen and then each sub-pixel is provided with a sampling zone. The displaying illumination of the sub-pixel is determined by calculating the surface area of the sampling zone and the overlapping condition of the theorectic pixel units that are covered thereby, as well as the color component of the sub-pixel contained in each theoretic pixel unit. In the pen tile structure, some of the sub-pixels of a display panel are shared so that a resolution that is higher than the actual resolution can be achieved for visual effect.

As shown in FIG. 1, a commonly used pen tile structure adopts a rectangular design, in which red sub-pixels (R) and blue pixels (B) alternate each other in rows in the horizontal direction and also in columns in the vertical direction. This arrangement, although providing an effect of mimicking a high resolution with a low resolution, makes the design of drive circuit (particularly, the design of arrangement of data lines) and software rendering.

SUMMARY OF THE INVENTION

An object of the present invention is to provide a pixel structure, which achieves an effect of mimicking a high resolution with a low resolution and also reduces the difficulty of designing a drive circuit so as to help simplify the manufacturing process and lower down costs.

To achieve the above object, the present invention provides a pixel structure, which comprises a plurality of sub-pixels, the plurality of sub-pixels being arranged in the form of a point lattice exhibiting a honeycomb configuration comprising honeycomb cells each showing a regular hexagon having edges that have a length a, the sub-pixels being respectively located at vertices of the plurality of regular hexagons;

the plurality of sub-pixels comprising a plurality of first color sub-pixels, a plurality of second color sub-pixels, and a plurality of third color sub-pixels;

wherein for two rows of the sub-pixels that are adjacent to each other in an up-down direction, the sub-pixels of one of the rows are arranged in a horizontal direction such that spacing distances therebetween are of an alternate arrangement of a and 2a, wherein for every two sub-pixels of which the spacing distance therebetween is a, the one of the sub-pixels that is located at the right-hand side is a first color sub-pixel, while the one of the sub-pixels that is located at the left-hand side is a second color sub-pixel; and, the sub-pixels of the other one of the rows are arranged in a horizontal direction such that spacing distances therebetween are of an alternate arrangement of 2a and a, wherein for every two sub-pixels of which the spacing distance therebetween is a, the one of the sub-pixels that is located at the right-hand side is a first color sub-pixel, while the one of the sub-pixels that is located at the left-hand side is a third color sub-pixel; and for each column of the sub-pixels, multiple ones of the sub-pixels having the same color are arranged in a straight line in a vertical direction, while two columns that are adjacent to each other in a left-right direction comprise sub-pixels of different colors.

A sub-pixel column that is formed of multiple first color sub-pixels arranged in the vertical direction, a sub-pixel column that is formed of multiple second color sub-pixels arranged in the vertical direction, a sub-pixel column that is formed of multiple first color sub-pixels arranged in the vertical direction, and a sub-pixel column that is formed of multiple third color sub-pixels arranged in the vertical direction are arranged, in such an order, from left to right.

The first color sub-pixels each have a surface area that is ½ of a surface area of one second color sub-pixel and the surface area of each of the second color sub-pixels is identical to a surface area of one third color sub-pixel.

Each of the first color sub-pixels and three other sub-pixels that are arranged with the first color sub-pixel as a center and are spaced from the first color sub-pixel by a distance a in different directions of edges of a hexagon collectively form a pixel.

The first color sub-pixel, the second color sub-pixel, the third color sub-pixel is one of combinations of a red sub-pixel, a green sub-pixel, and a blue sub-pixel.

The first color sub-pixel is a green sub-pixel; the second color sub-pixel is a red sub-pixel; and the third color sub-pixel is a blue sub-pixel.

A ratio among numbers of green sub-pixels, red sub-pixels, and blue sub-pixels contained in each of the pixels is 1:1:2 or 1:2:1.

When the pixel of which the ratio of the numbers of the green sub-pixels, the red sub-pixels, and the blue sub-pixels is 1:1:2 display white color, the green sub-pixels and the red sub-pixels show brightness that is set at 100%, while the blue sub-pixels show brightness that is set at 50%; and when pixel of which the ratio of the numbers of the green sub-pixels, the red sub-pixels, and the blue sub-pixels is 1:2:1 display white color, the green sub-pixels and the blue sub-pixels show brightness that is set at 100%, while the red sub-pixels show brightness that is set at 50%.

Multiple scan lines that are respectively connected to the rows of the sub-pixels are arranged from top to bottom with identical spacing distances therebetween and multiple data lines that are respectively connected to the columns of the sub-pixels are arranged from left to right with alternate spacing distances of a/2 and a therebetween.

The present invention also provides a pixel structure, which comprises a plurality of sub-pixels, the plurality of sub-pixels being arranged in the form of a point lattice exhibiting a honeycomb configuration comprising honeycomb cells each showing a regular hexagon having edges that have a length a, the sub-pixels being respectively located at vertices of the plurality of regular hexagons;

the plurality of sub-pixels comprising a plurality of first color sub-pixels, a plurality of second color sub-pixels, and a plurality of third color sub-pixels;

wherein for two rows of the sub-pixels that are adjacent to each other in an up-down direction, the sub-pixels of one of the rows are arranged in a horizontal direction such that spacing distances therebetween are of an alternate arrangement of a and 2a, wherein for every two sub-pixels of which the spacing distance therebetween is a, the one of the sub-pixels that is located at the right-hand side is a first color sub-pixel, while the one of the sub-pixels that is located at the left-hand side is a second color sub-pixel; and, the sub-pixels of the other one of the rows are arranged in a horizontal direction such that spacing distances therebetween are of an alternate arrangement of 2a and a, wherein for every two sub-pixels of which the spacing distance therebetween is a, the one of the sub-pixels that is located at the right-hand side is a first color sub-pixel, while the one of the sub-pixels that is located at the left-hand side is a third color sub-pixel; and for each column of the sub-pixels, multiple ones of the sub-pixels having the same color are arranged in a straight line in a vertical direction, while two columns that are adjacent to each other in a left-right direction comprise sub-pixels of different colors;

wherein a sub-pixel column that is formed of multiple first color sub-pixels arranged in the vertical direction, a sub-pixel column that is formed of multiple second color sub-pixels arranged in the vertical direction, a sub-pixel column that is formed of multiple first color sub-pixels arranged in the vertical direction, and a sub-pixel column that is formed of multiple third color sub-pixels arranged in the vertical direction are arranged, in such an order, from left to right;

wherein the first color sub-pixels each have a surface area that is ½ of a surface area of one second color sub-pixel and the surface area of each of the second color sub-pixels is identical to a surface area of one third color sub-pixel; and wherein multiple scan lines that are respectively connected to the rows of the sub-pixels are arranged from top to bottom with identical spacing distances therebetween and multiple data lines that are respectively connected to the columns of the sub-pixels are arranged from left to right with alternate spacing distances of a/2 and a therebetween.

The efficacy of the present invention is that the present invention provides a pixel structure, which comprises a plurality of sub-pixels arranged in the form of a point lattice exhibiting a honeycomb configuration comprising honeycomb cells each showing a regular hexagon having edges that have a length a; for two rows of the sub-pixels that are adjacent to each other in an up-down direction, the sub-pixels of one of the rows are arranged in a horizontal direction such that spacing distances therebetween are of an alternate arrangement of a and 2a, wherein for every two sub-pixels of which the spacing distance therebetween is a, the one of the sub-pixels that is located at the right-hand side is a first color sub-pixel, while the one of the sub-pixels that is located at the left-hand side is a second color sub-pixel; and, the sub-pixels of the other one of the rows are arranged in a horizontal direction such that spacing distances therebetween are of an alternate arrangement of 2a and a, wherein for every two sub-pixels of which the spacing distance therebetween is a, the one of the sub-pixels that is located at the right-hand side is a first color sub-pixel, while the one of the sub-pixels that is located at the left-hand side is a third color sub-pixel; for each column of the sub-pixels, multiple ones of the sub-pixels having the same color are arranged in a straight line in a vertical direction. Such a pixel structure achieves an effect of mimicking a high resolution with a low resolution and also reduces the design difficulty of a drive circuit thereby helping simplify the manufacturing process and lower down costs.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will become apparent from the following detailed description of an embodiment of the present invention, with reference to the attached drawings.

In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
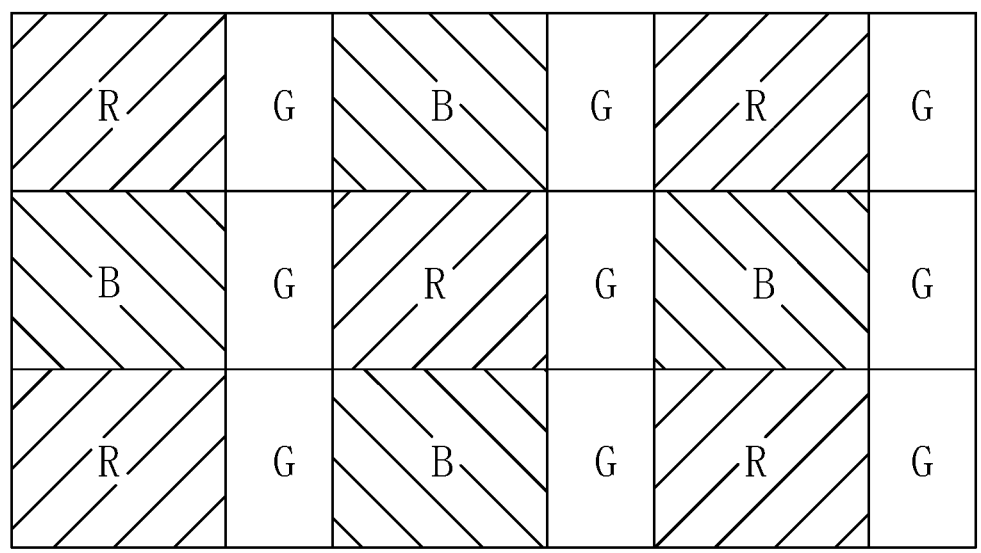
FIG. 1 is a schematic view illustrating a pixel arrangement of a known pen tile structure.
Figure 2:
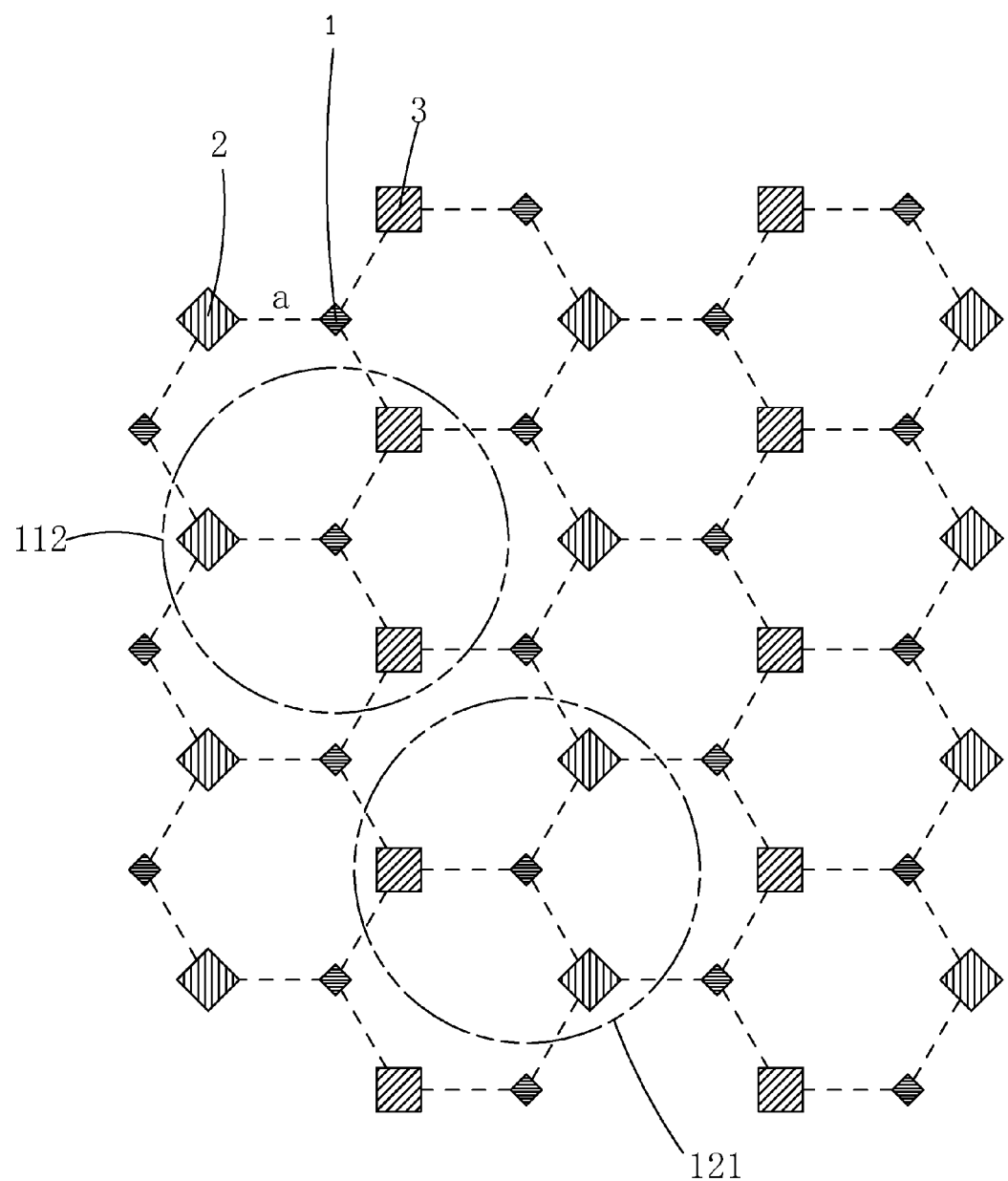
FIG. 2 is a schematic view illustrating a pixel structure according to the present invention.

Referring to FIG. 2, the present invention provides a pixel structure, which comprises a plurality of sub-pixels. The plurality of sub-pixels is arranged in the form of a point lattice exhibiting a honeycomb configuration comprising honeycomb cells each showing a regular hexagon having edges that have a length a. The sub-pixels are respectively located at vertices of the plurality of regular hexagons.

The plurality of sub-pixels comprises a plurality of first color sub-pixels 1, a plurality of second color sub-pixels 2, and a plurality of third color sub-pixels 3.

For two rows of the sub-pixels that are adjacent to each other in an up-down direction, the sub-pixels of one of the rows are arranged in a horizontal direction such that spacing distances therebetween are of an alternate arrangement of a and 2a, wherein for every two sub-pixels of which the spacing distance therebetween is a, the one of the sub-pixels that is located at the right-hand side is a first color sub-pixel 1, while the one of the sub-pixels that is located at the left-hand side is a second color sub-pixel 2; and, the sub-pixels of the other one of the rows are arranged in a horizontal direction such that spacing distances therebetween are of an alternate arrangement of 2a and a, wherein for every two sub-pixels of which the spacing distance therebetween is a, the one of the sub-pixels that is located at the right-hand side is a first color sub-pixel 1, while the one of the sub-pixels that is located at the left-hand side is a third color sub-pixel 3.

For each column of the sub-pixels, multiple ones of the sub-pixels having the same color are arranged in a straight line in a vertical direction, while two columns that are adjacent to each other in a left-right direction comprise sub-pixels of different colors.

Further, a sub-pixel column that is formed of multiple first color sub-pixels 1 arranged in the vertical direction, a sub-pixel column that is formed of multiple second color sub-pixels 2 arranged in the vertical direction, a sub-pixel column that is formed of multiple first color sub-pixels 1 arranged in the vertical direction, and a sub-pixel column that is formed of multiple third color sub-pixels 3 arranged in the vertical direction are arranged, in such an order, from left to right. Since the sub-pixels that are located in the same column have the same color and are arranged in a straight line in the vertical direction, it is possible to design a data line for a column of the sub-pixels for driving purpose so that, compared to the known rectangular pen tile structure, the difficulty of designing a drive circuit can be reduced thereby helping simplify the manufacturing process and lower down costs.

The first color sub-pixels 1 each have a surface area that is one half (½) of a surface area of one second color sub-pixels 2 and the surface area of each of the second color sub-pixels 2 is identical to a surface area of one third color sub-pixel 3.

A pixel is formed of a first color sub-pixel 1 and three other sub-pixels that are arranged with the first color sub-pixel 1 as a center and are spaced from the first color sub-pixels 1 by a distance a in different directions along the edges of the hexagon. As shown in FIG. 2, the pixel 112 is formed of one of the first color sub-pixels 1 and one of the second color sub-pixels 2 and two of the third color sub-pixels 3 that are arranged with said one of the first color sub-pixels 1 as a center and are spaced from said one of the first color sub-pixels 1 by a distance a in different directions of the edges of the hexagon; and the pixel 121 is formed of one of the first color sub-pixels 1 and two of the second color sub-pixels 2 and one of the third color sub-pixels 3 that re arranged with said one of the first color sub-pixels 1 as a center and are spaced from said one of the first color sub-pixels 1 by a distance a in different directions of the edges of the hexagon. The structure that each honeycomb cell is of a regular hexagon makes each of the second color sub-pixels 2 shared by three pixels and each of the third color sub-pixels 3 shared by three pixels, so as to provide, visually, a resolution higher than the actual resolution thereby achieving an effect of mimicking a high resolution with a low resolution.

Specifically, the first color sub-pixel 1, the second color sub-pixel 2, the third color sub-pixel 3 can be any one of various combinations and permutations of a red sub-pixel, a green sub-pixel, and a blue sub-pixel. Preferably, the first color sub-pixel 1 is a green sub-pixel; the second color sub-pixel 2 is a red sub-pixel; and the third color sub-pixel 3 is a blue sub-pixel. As reflected in FIG. 2, each of the pixels 112 that is centered at each of even-column green sub-pixels shows a ratio of 1:1:2 among the numbers of the green sub-pixels, the red sub-pixels, and the blue sub-pixels; and each of the pixels 121 that is centered at each of odd-column green sub-pixels shows a ratio of 1:2:1 among the numbers of the green sub-pixels, the red sub-pixels, and the blue sub-pixels.

It is noted here that when each of the pixels 112 centered at each of the even-column green sub-pixels, which is the pixel that shows the ratio of 1:1:2 among the numbers of the green sub-pixels, the red sub-pixels, and the blue sub-pixels, display white color, the green sub-pixels and the red sub-pixels show brightness that is set at 100%, while the blue sub-pixels show brightness that is set at 50%; and when each of the pixels 121 centered at each of the odd-column green sub-pixels, which is the pixel that shows the ratio of 1:2:1 among the numbers of the green sub-pixels, the red sub-pixels, and the blue sub-pixels, display white color, the green sub-pixels and the blue sub-pixels show brightness that is set at 100%, while the red sub-pixels show brightness that is set at 50%.

Figure 3:
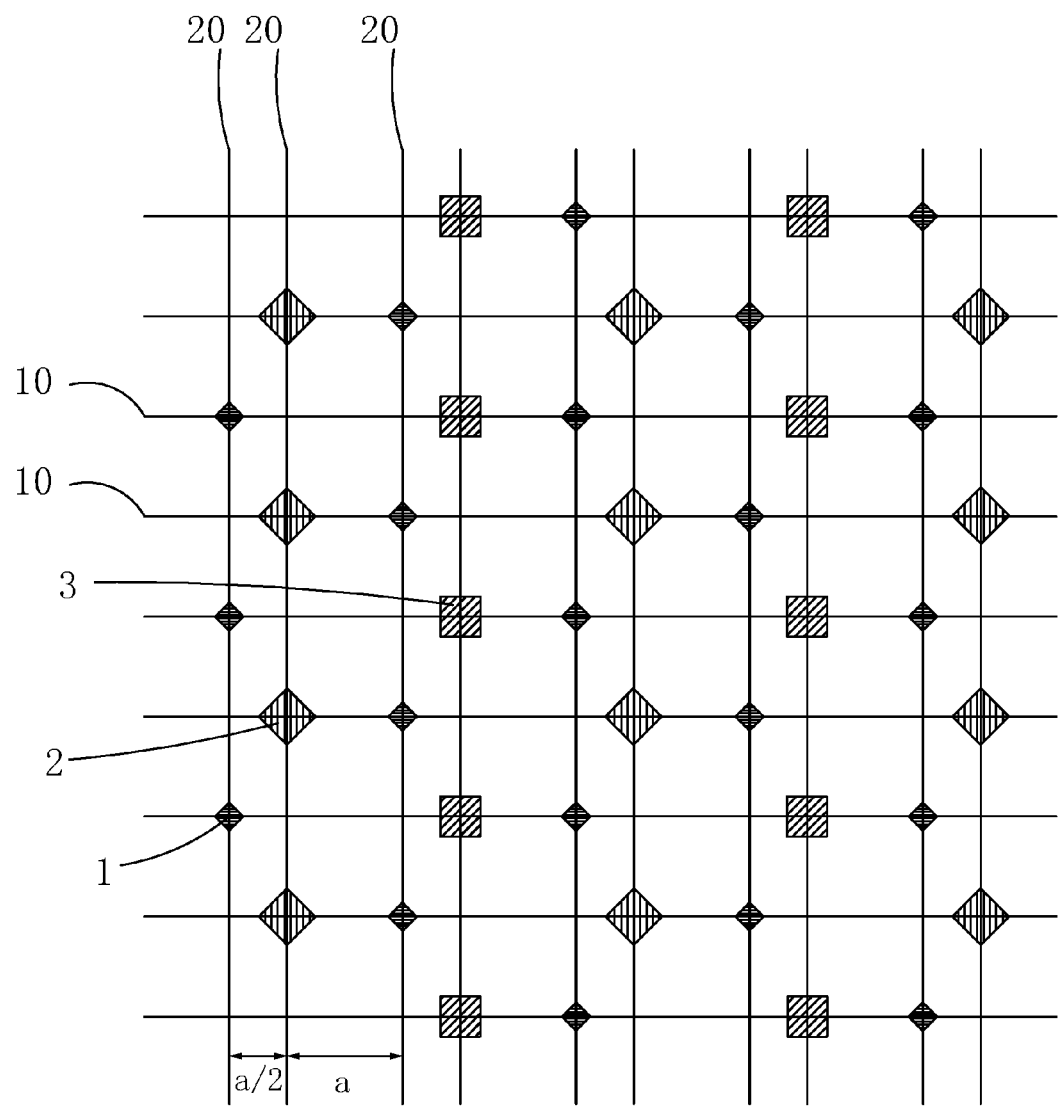
FIG. 3 is a schematic view illustrating an arrangement of scan lines and data lines of the pixel structure according to the present invention.

As shown in FIG. 3, to accommodate the pixel structure according to the present invention, multiple scan lines 10 that are respectively connected to the rows of the sub-pixels are arranged from top to bottom with identical spacing distances therebetween and multiple data lines 20 that are respectively connected to the columns of the sub-pixels are arranged from left to right with alternate spacing distances of a/2 and a therebetween. In other words, a data line is provided for each column of the sub-pixels for driving so that the design difficulty of the drive circuit can be reduced.

The pixel structure according to the present invention can be expanded to sub-pixels of four different colors in an alternate arrangement.

In summary, the present invention provides a pixel structure, which comprises a plurality of sub-pixels arranged in the form of a point lattice exhibiting a honeycomb configuration comprising honeycomb cells each showing a regular hexagon having edges that have a length a; for two rows of the sub-pixels that are adjacent to each other in an up-down direction, the sub-pixels of one of the rows are arranged in a horizontal direction such that spacing distances therebetween are of an alternate arrangement of a and 2a, wherein for every two sub-pixels of which the spacing distance therebetween is a, the one of the sub-pixels that is located at the right-hand side is a first color sub-pixel, while the one of the sub-pixels that is located at the left-hand side is a second color sub-pixel; and, the sub-pixels of the other one of the rows are arranged in a horizontal direction such that spacing distances therebetween are of an alternate arrangement of 2a and a, wherein for every two sub-pixels of which the spacing distance therebetween is a, the one of the sub-pixels that is located at the right-hand side is a first color sub-pixel, while the one of the sub-pixels that is located at the left-hand side is a third color sub-pixel; for each column of the sub-pixels, multiple ones of the sub-pixels having the same color are arranged in a straight line in a vertical direction. Such a pixel structure achieves an effect of mimicking a high resolution with a low resolution and also reduces the design difficulty of a drive circuit thereby helping simplify the manufacturing process and lower down costs.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A pixel structure, comprising a plurality of sub-pixels, the plurality of sub-pixels being arranged in the form of a point lattice exhibiting a honeycomb configuration comprising honeycomb cells each showing a regular hexagon having edges that have a length a, the sub-pixels being respectively located at vertices of the plurality of regular hexagons;

the plurality of sub-pixels comprising a plurality of first color sub-pixels, a plurality of second color sub-pixels, and a plurality of third color sub-pixels;

wherein for two rows of the sub-pixels that are adjacent to each other in an up-down direction, the sub-pixels of one of the rows are arranged in a horizontal direction such that spacing distances therebetween are of an alternate arrangement of a and 2a, wherein for every two sub-pixels of which the spacing distance therebetween is a, the one of the sub-pixels that is located at the right-hand side is a first color sub-pixel, while the one of the sub-pixels that is located at the left-hand side is a second color sub-pixel; and, the sub-pixels of the other one of the rows are arranged in a horizontal direction such that spacing distances therebetween are of an alternate arrangement of 2a and a, wherein for every two sub-pixels of which the spacing distance therebetween is a, the one of the sub-pixels that is located at the right-hand side is a first color sub-pixel, while the one of the sub-pixels that is located at the left-hand side is a third color sub-pixel; and for each column of the sub-pixels, multiple ones of the sub-pixels having the same color are arranged in a straight line in a vertical direction, while two columns that are adjacent to each other in a left-right direction comprise sub-pixels of different colors.

2. The pixel structure as claimed in claim 1, wherein a sub-pixel column that is formed of multiple first color sub-pixels arranged in the vertical direction, a sub-pixel column that is formed of multiple second color sub-pixels arranged in the vertical direction, a sub-pixel column that is formed of multiple first color sub-pixels arranged in the vertical direction, and a sub-pixel column that is formed of multiple third color sub-pixels arranged in the vertical direction are arranged, in such an order, from left to right.

3. The pixel structure as claimed in claim 1, wherein the first color sub-pixels each have a surface area that is ½ of a surface area of one second color sub-pixel and the surface area of each of the second color sub-pixels is identical to a surface area of one third color sub-pixel.

4. The pixel structure as claimed in claim 3, wherein each of the first color sub-pixels and three other sub-pixels that are arranged with the first color sub-pixel as a center and are spaced from the first color sub-pixel by a distance a in different directions of edges of a hexagon collectively form a pixel.

5. The pixel structure as claimed in claim 4, wherein the first color sub-pixel, the second color sub-pixel, the third color sub-pixel is one of combinations of a red sub-pixel, a green sub-pixel, and a blue sub-pixel.

6. The pixel structure as claimed in claim 5, wherein the first color sub-pixel is a green sub-pixel; the second color sub-pixel is a red sub-pixel; and the third color sub-pixel is a blue sub-pixel.

7. The pixel structure as claimed in claim 6, wherein a ratio among numbers of green sub-pixels, red sub-pixels, and blue sub-pixels contained in each of the pixels is 1:1:2 or 1:2:1.

8. The pixel structure as claimed in claim 7, wherein when the pixel of which the ratio of the numbers of the green sub-pixels, the red sub-pixels, and the blue sub-pixels is 1:1:2 display white color, the green sub-pixels and the red sub-pixels show brightness that is set at 100%, while the blue sub-pixels show brightness that is set at 50%; and when pixel of which the ratio of the numbers of the green sub-pixels, the red sub-pixels, and the blue sub-pixels is 1:2:1 display white color, the green sub-pixels and the blue sub-pixels show brightness that is set at 100%, while the red sub-pixels show brightness that is set at 50%.

9. The pixel structure as claimed in claim 1, wherein multiple scan lines that are respectively connected to the rows of the sub-pixels are arranged from top to bottom with identical spacing distances therebetween and multiple data lines that are respectively connected to the columns of the sub-pixels are arranged from left to right with alternate spacing distances of a/2 and a therebetween.

10. A pixel structure, comprising a plurality of sub-pixels, the plurality of sub-pixels being arranged in the form of a point lattice exhibiting a honeycomb configuration comprising honeycomb cells each showing a regular hexagon having edges that have a length a, the sub-pixels being respectively located at vertices of the plurality of regular hexagons;

the plurality of sub-pixels comprising a plurality of first color sub-pixels, a plurality of second color sub-pixels, and a plurality of third color sub-pixels;

wherein for two rows of the sub-pixels that are adjacent to each other in an up-down direction, the sub-pixels of one of the rows are arranged in a horizontal direction such that spacing distances therebetween are of an alternate arrangement of a and 2a, wherein for every two sub-pixels of which the spacing distance therebetween is a, the one of the sub-pixels that is located at the right-hand side is a first color sub-pixel, while the one of the sub-pixels that is located at the left-hand side is a second color sub-pixel; and, the sub-pixels of the other one of the rows are arranged in a horizontal direction such that spacing distances therebetween are of an alternate arrangement of 2a and a, wherein for every two sub-pixels of which the spacing distance therebetween is a, the one of the sub-pixels that is located at the right-hand side is a first color sub-pixel, while the one of the sub-pixels that is located at the left-hand side is a third color sub-pixel; and for each column of the sub-pixels, multiple ones of the sub-pixels having the same color are arranged in a straight line in a vertical direction, while two columns that are adjacent to each other in a left-right direction comprise sub-pixels of different colors;

wherein a sub-pixel column that is formed of multiple first color sub-pixels arranged in the vertical direction, a sub-pixel column that is formed of multiple second color sub-pixels arranged in the vertical direction, a sub-pixel column that is formed of multiple first color sub-pixels arranged in the vertical direction, and a sub-pixel column that is formed of multiple third color sub-pixels arranged in the vertical direction are arranged, in such an order, from left to right;

wherein the first color sub-pixels each have a surface area that is ½ of a surface area of one second color sub-pixel and the surface area of each of the second color sub-pixels is identical to a surface area of one third color sub-pixel; and wherein multiple scan lines that are respectively connected to the rows of the sub-pixels are arranged from top to bottom with identical spacing distances therebetween and multiple data lines that are respectively connected to the columns of the sub-pixels are arranged from left to right with alternate spacing distances of a/2 and a therebetween.

11. The pixel structure as claimed in claim 10, wherein each of the first color sub-pixels and three other sub-pixels that are arranged with the first color sub-pixel as a center and are spaced from the first color sub-pixel by a distance a in different directions of edges of a hexagon collectively form a pixel.

12. The pixel structure as claimed in claim 11, wherein the first color sub-pixel, the second color sub-pixel, the third color sub-pixel is one of combinations of a red sub-pixel, a green sub-pixel, and a blue sub-pixel.

13. The pixel structure as claimed in claim 12, wherein the first color sub-pixel is a green sub-pixel; the second color sub-pixel is a red sub-pixel; and the third color sub-pixel is a blue sub-pixel.

14. The pixel structure as claimed in claim 13, wherein a ratio among numbers of green sub-pixels, red sub-pixels, and blue sub-pixels contained in each of the pixels is 1:1:2 or 1:2:1.

15. The pixel structure as claimed in claim 14, wherein when the pixel of which the ratio of the numbers of the green sub-pixels, the red sub-pixels, and the blue sub-pixels is 1:1:2 display white color, the green sub-pixels and the red sub-pixels show brightness that is set at 100%, while the blue sub-pixels show brightness that is set at 50%; and when pixel of which the ratio of the numbers of the green sub-pixels, the red sub-pixels, and the blue sub-pixels is 1:2:1 display white color, the green sub-pixels and the blue sub-pixels show brightness that is set at 100%, while the red sub-pixels show brightness that is set at 50%.

* * * * *